United States Patent
Simko et al.

(10) Patent No.: US 12,441,981 B2
(45) Date of Patent: Oct. 14, 2025

(54) EXTRACELLULAR MATRIX SCAFFOLDS

(71) Applicant: Carnegie Mellon University, Pittsburgh, PA (US)

(72) Inventors: Rachelle Simko, Pittsburgh, PA (US); Adam Feinberg, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 783 days.

(21) Appl. No.: 17/535,094

(22) Filed: Nov. 24, 2021

(65) Prior Publication Data
US 2022/0333063 A1 Oct. 20, 2022

Related U.S. Application Data

(63) Continuation of application No. 15/610,125, filed on May 31, 2017, now abandoned.

(60) Provisional application No. 62/392,389, filed on May 31, 2016.

(51) Int. Cl.
| | |
|---|---|
| C12N 5/00 | (2006.01) |
| A61L 27/16 | (2006.01) |
| A61L 27/18 | (2006.01) |
| A61L 27/36 | (2006.01) |
| A61L 27/38 | (2006.01) |
| A61L 27/50 | (2006.01) |

(52) U.S. Cl.
CPC ............ *C12N 5/0062* (2013.01); *A61L 27/16* (2013.01); *A61L 27/18* (2013.01); *A61L 27/3633* (2013.01); *A61L 27/38* (2013.01); *A61L 27/50* (2013.01); *C12N 5/0012* (2013.01); *C12N 5/0068* (2013.01); *C12N 2531/00* (2013.01); *C12N 2533/90* (2013.01); *C12N 2535/00* (2013.01); *C12N 2539/10* (2013.01)

(58) Field of Classification Search
None
See application file for complete search history.

(56) References Cited

U.S. PATENT DOCUMENTS

2017/0342374 A1 11/2017 Simko et al.

OTHER PUBLICATIONS

Palchesko et al., Cell. Mol. Bioeng. 7(3): 355-368 (2014).*
Yu et al., Biomaterials 31: 7012-7020 (2010).*
(Continued)

*Primary Examiner* — Erin M. Bowers
(74) *Attorney, Agent, or Firm* — Fish & Richardson P.C.

(57) ABSTRACT

A method for micro-tissue encapsulation of cells includes coating a tissue scaffold stamp with an extracellular matrix compound; depositing the tissue scaffold stamp onto a thermoresponsive substrate; seeding the tissue scaffold stamp with a cell culture; incubating the cell culture on the tissue scaffold stamp at a temperature that is specified, wherein the cell culture forms a cell patch that is attached to the extracellular matrix compound; removing the thermoresponsive substrate by lowering the temperature; removing the tissue scaffold stamp from the cell patch to form a micro-tissue structure by dissolving the tissue scaffold stamp in a solvent; folding the micro-tissue structure by suspending the micro-tissue in the solvent to enable the cell patch to fold the micro-tissue structure; collecting the folded micro-tissue structure from the solvent; and administering the folded micro-tissue structure to an organism.

17 Claims, 11 Drawing Sheets

(56) References Cited

OTHER PUBLICATIONS

Palchesko et al., "Shrink Wrapping Cells in a Defined Extracellular Matrix to Modulate the Chemo-Mechanical Microenvironment," Cellular and Molecular Bioengineering, Aug. 12, 2014, 7(3):355-368.

Yu et al., "The use of human mesenchymal stem cell encapsulated in RGD modified alginate microspheres in the repair of myocardial infarction in the rat," Biomaterials, 2010, 31: 7012-7020.

Palchesko et al., "Engineering Basement Membrane Micro-Scaffolds for Repair of the Corneal Endothelium," PowerPoint, Presented at ACS Colloid and Surface Science Symposium, Pittsburgh, PA, Jun. 15-17, 2015, 19 pages.

\* cited by examiner

105

FN in solution partially unfolds as it adsorbs to the PDMS surface

100

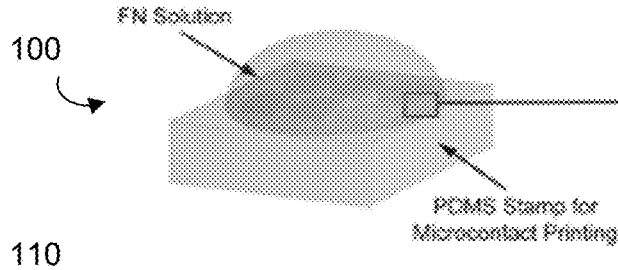

110

Unfolded FN is transferred from the PDMS to the PIPAAm by microcontact printing

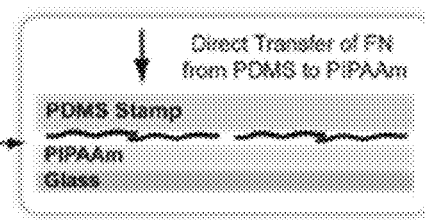

120

Cell seeding and binding to micropatterned ECM

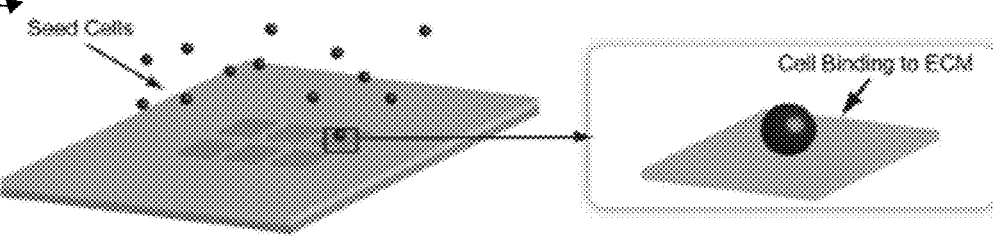

130

Cells spread on ECM, afterwhich PIPAAm is thermally triggered to dissolve

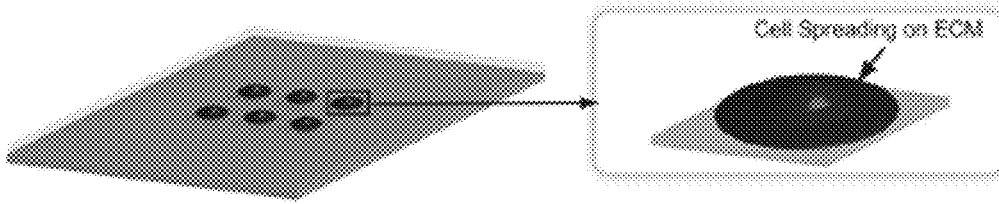

140

Cells are "shrink-wrapped" in ECM protein nano-scaffolds and are free-floating in suspension

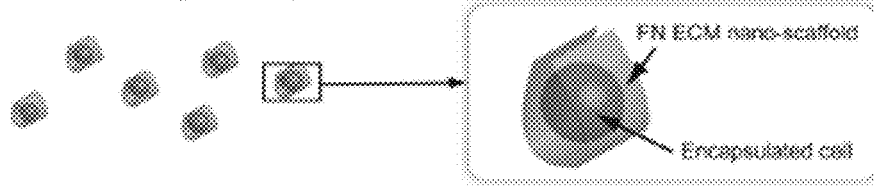

FIG. 1

EXTRACELLULAR MATRIX SCAFFOLDS

CLAIM OF PRIORITY

This application is a continuation of and claims priority to U.S. patent application Ser. No. 15/610,125, filed on May 31, 2017, which claims priority under 35 U.S.C. § 119(e) to U.S. Patent Application Ser. No. 62/392,389, filed on May 31, 2016, the entire contents of which are hereby incorporated by reference.

GOVERNMENT RIGHTS

This invention was made with government support under the National Institutes of Health Grant No. DP2HL117750. The government has certain rights in this invention.

BACKGROUND

Administration of cells to patients has become a promising therapy for many diseases. However, cells delivered in single cell suspension often die quickly after being injected into the site for repair and it is also unknown if single cells can adequately repair damaged or failing organs and tissues that are composed of millions of cells. Current methods for cell injection therapy involve using enzymatic release of cells into a single cell suspension which causes changes in their cellular structure and phenotype. Additionally, injected single cells often die after injection from a combination of stress induced from the physical injection process and lack of attachment to the desired tissue.

SUMMARY

The systems and processes described in this document allow for the formation of small intact 2D micro-tissues and application of the micro-tissues to the body. The thermal release of these 2D micro-tissues from a substrate on which they are cultured allows for the cells to maintain their structure and phenotype, which allows the cells to repair damaged tissue after delivery. The extracellular matrix protein scaffold the micro-tissues are formed on wraps around the cells to protect them from the physical stress of the delivery process and also provides the necessary attachment sites to help the micro-tissue attach to the desired tissue for repair.

A wide range of cell encapsulation techniques have been developed to engineer a defined microenvironment that can protect cells from the surrounding environment, sequester growth factors or drugs with the cells, and increase the retention of cells injected into tissues. For example, researchers have demonstrated the use of microfluidics to encapsulate suspended cells within a gelatin core surrounded by a silica-gel shell that provides protection from oxidative and mechanical stress. Similar to many encapsulation approaches, after a defined period of time the gel breaks down, enabling the cells to migrate out into the surrounding environment. In another approach, micro patterned surfaces were used to encapsulate cells in a pyrole-alginate hydrogel that simultaneously could perform controlled release of protein. This system enabled the controlled presentation of soluble and in soluble factors while maintaining high cell viability. Recent work has also demonstrated that encapsulation materials based on polydimethylsiloxane (PDMS) and calcium peroxide can actively release oxygen to support metabolic activity in larger constructs that would otherwise suffer from hypoxia-induced necrotic cores. However, while these examples encapsulate cells, to date none have done so in an ECM that is similar in density, structure or composition to the native ECM these cells are surrounded by in vivo. The ECM provides a unique microenvironment that more closely matches that found in vivo and thus improves the ability to modulate cell behavior.

This document describes a method for micro-encapsulation of cells, including coating a tissue scaffold stamp with an extracellular matrix compound; depositing the tissue scaffold stamp onto a thermoresponsive substrate; seeding the tissue scaffold stamp with a cell culture; incubating the cell culture on the tissue scaffold stamp at a temperature that is specified, where the cell culture forms a cell patch that is attached to the extracellular matrix compound; removing the thermoresponsive substrate by lowering the temperature; removing the tissue scaffold stamp from the cell patch to form a micro-tissue structure by dissolving the tissue scaffold stamp in a solvent; folding the micro-tissue structure by suspending the micro-tissue in the solvent to enable the cell patch to fold the micro-tissue structure; collecting the folded micro-tissue structure from the solvent; and administering the folded micro-tissue structure to an organism.

In some implementations, the methods and systems further include administering the micro-tissue structure to an organism includes injecting the micro-tissue structure. In some implementations, folded micro-tissue structure is configured to protect the cell patch from forces during the injecting.

In some implementations, a size of the micro-tissue structure is proportional to a size of the tissue scaffold stamp, and the size of the micro-tissue structure is a fraction of a diameter of an injecting apparatus.

In some implementations, the tissue scaffold stamp includes an organosilicon compound. The organosilicon compound includes Polydimethylsiloxane.

In some implementations, the extracellular matrix compound includes a protein including one or more of collagen IV, laminin, a fibroblast growth factor protein, and a vascular endothelial growth factor protein.

In some implementations, depositing the tissue scaffold stamp includes printing the tissue scaffold stamp onto the thermoresponsive substrate. The thermoresponsive substrate includes a PIPAAm polymer. In some implementations, the tissue scaffold stamp forms a regular geometry. In some implementations, the tissue scaffold stamp includes a surface dimension of less than or approximately equal to 250 µm2.

In some implementations, the cell culture includes one or more populations of corneal endothelial cells. In some implementations, the cell culture includes one or more populations of stem cells. In some implementations, the cell culture forms a monolayer on the tissue scaffold stamp.

This document describes a cell patch including binders exposed on a first side of the cell patch; and an extracellular matrix compound that is attached to a second side of the cell patch and that forms a base for the cell patch, where the extracellular matrix compound is configured to be responsive to one or more tension forces expressed by the cell patch, where the one or more tension forces cause the extracellular matrix compound to fold into a specified geometry around the cell patch, where the specified geometry substantially conceals the expressed binders of the cell patch.

In some implementations, the one or more tension forces are expressed by one or more junctions of one or more respective cells that form the cell patch. In some implementations, the extracellular matrix compound is configured to fold into the compact geometry in response to removal of an organosilicon compound scaffold from the extracellular matrix compound. In some implementations, the extracellular matrix compound is configured to alter a form factor into a planar geometry that exposes the expressed binders of the cell patch, and where the extracellular matrix compound is configured to alter the form factor after a delay in response to folding into the specified geometry.

DESCRIPTION OF DRAWINGS

FIG. 1 shows a process for extracellular matrix encapsulation.

DETAILED DESCRIPTION

Figure 2:
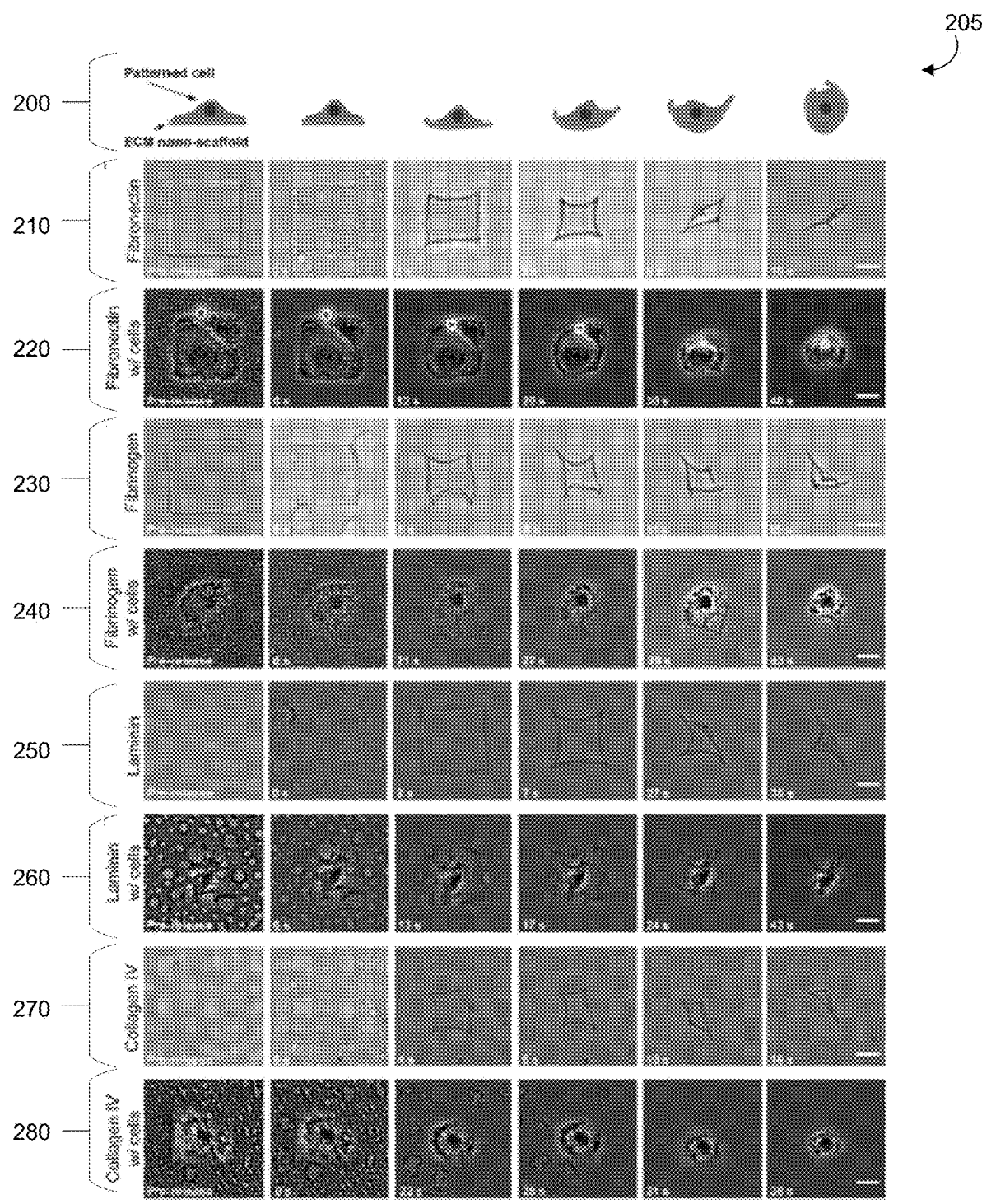
FIGS. 2-4 show images of extracellular matrix encapsulation.

The extracellular matrix (ECM) described herein includes an array of geometrical shapes that will fold upon release. For example, the ECM can form one or more patterned geometries that have micrometer dimensions for length and width and nanometer thickness. In some examples, the geometrical shapes in the array include extracellular matrix proteins that can be used to culture cells that allow for the formation of 2D micro-tissues. These micro-tissues can then be released from a substrate upon which they are formed. In some implementations, the micro-tissues are thermally released. Upon release, these micro-tissues spontaneously fold up such that the ECM forms an outer layer around the cultured cells, and the cultured cells retain their micro-tissue structure and phenotype. The folded micro-tissues can then be administered, for example by injection through a needle, to repair or replace tissues. The micro-tissues have in vivo and in vitro applications. For example, the micro-tissues support the formation of corneal endothelial cell microtissues that can be injected through a small gauge needle.

The extracellular matrix (ECM) includes a fibrillar network of proteins, glycosaminoglycans and other biomolecules. The ECM forms a scaffold around cells that provides, for example, structural support, growth factor sequestration, a network for adhesion and mechanical signaling, and a host of other functions. The ECM can function as an environment, or niche, that is suitable for the functioning of the cultured cells of the micro-tissues. For example, the adult stem cell niche includes a unique ECM protein structure, composition, support cell population and set of soluble and insoluble signaling molecules that help maintain the multipotent state of the stem cells. The ECM is an artificially produced protein matrix, rather than a naturally-occurring ECM. The selection of ECM proteins is chosen based on the cell culture being produced, as described in further detail below.

In some examples, 2D culture cells are typically grown on rigid tissue culture treated polystyrene (TCPS) that is precoated with an ECM protein or coated with ECM proteins that are included in a serum supplemented into the media. While such ECM proteins enable adhesion of cells to the TCPS and subsequent proliferation, many primary cell types can only be passaged a limited number of times before becoming senescent of changing phenotype, such as undergoing epithelial to mesenchymal transition (EMT). Culture in 3D using synthetic and/or natural hydrogels can address some of these limitations by altering the chemo-mechanical environment to better replicate in vivo conditions and have been effective for culturing a wide range of cell types. However, these hydrogels are typically isotropic in structure, do not recreate ECM dense structures such as basement membranes and have compositions (e.g., collagen, fibrin, matrigel, PEG) that typically differ from that of the complex in vivo environment. Further, passaging these cells, whether in 2D or 3D, often requires using enzymes and calcium chelators that disrupt cell-matrix and cell-cell adhesion to produce a single cell suspension. When re-seeded the cells must expend energy to reestablish cell matrix and cell-cell adhesions in the new environment into which they are placed. The ECM is configured to mimic a cell microenvironment that is found in vivo by (i) encapsulating cells in a defined ECM that better mimics the native ECM structure and (ii) minimally disrupting cell-matrix and cell-cell adhesions.

ECM nano-scaffolds are formed that can be used to at least partially encapsulate cells in order to modulate the chemo-mechanical microenvironment. Using an adaptation of surface-initiated assembly (SIA), well-defined nano-scaffolds of assembled ECM proteins are formed into free standing structures. By adhering cells prior to the release of these ECM nano-scaffolds, the cells are encapsulated (e.g., shrink-wrapped), in a layer of assembled protein matrix. In some implementations the ECM nano-scaffolds are engineered at the size scale of the cell, ~75 μm in lateral dimensions and ~50 nm thick. In some implementations, the SIA approach can be used to encapsulate a variety of cell types in defined ECM including one or more of fibronectin (FN), laminin (LAM), fibrinogen (FIB) and collagen type IV (Col IV), representing the major protein composition of the native pericellular matrix. The long-term goal is that these ECM nano-scaffolds and the encapsulation process will enhance therapeutic cell delivery by supporting survival and functional integration of cells in an otherwise diseased matrix environment, such as that found in infarcted myocardium.

The ECM nano-scaffolds can be used with any adherent cell type and could even be extended to non-adherent cells if antibodies for cell surface markers are mixed in the ECM protein solution before incubating on the PDMS stamp. For example, cell types can include hepatocytes, which includes an adherent cell type. For example, cell types can include killer t cell, which are a non-adherent cell-type, and are combined with a cell surface marker antibody in the ECM. These cell types can be used with collagen I, collagen IV, fibronectin, laminin, vitronectin, and any ECM protein that can be microcontact printed.

Referring to FIG. 1, a process 105 is shown for forming ECM nano-scaffolds. The ECM nano-scaffolds for encapsulation were fabricated using surface-initiated assembly (SIA). PDMS stamps for microcontact printing were prepared using established soft lithography techniques and used to pattern 75 μm squares of ECM protein onto poly(N-isopropylacrylamide) (PIPAAm) coated glass cover slips. In some implementations, the PDMS stamps were sonicated in a 50% ethanol solution for approximately 60 minutes and then dried under a stream of nitrogen. Dedicated PDMS stamps were used for each ECM protein to prevent cross-contamination. The stamps were incubated for 60 minutes with either fibronectin (FN, BD Biosciences), laminin (LAM, BD Biosciences), fibrinogen (FIB, MP Biomedical), or collagen IV (Col IV, BD Biosciences) at a concentration of approximately 50 µg/mL (FN, LAM, Fib) or 500 µg/mL (Col IV) in sterile distilled water, as shown in step 100 of FIG. 1. The PDMS stamps were washed in sterile water to remove excess protein, and then dried (e.g., by a stream of nitrogen). The ECM protein coated PDMS stamps were used to microcontact print PIPAAm coated coverslips. In some implementations, contact was maintained for 30 min to ensure transfer of the 75 µm square pattern, as shown by step 120 in FIG. 1. Upon removal of the PDMS stamps, the quality of the ECM squares on the PIPAAm was inspected using phase contrast microscopy. In some implementations, coverslips were placed in a Petri dish and ~42° C. phosphate buffered saline (PBS) is added and allowed to cool to room temperature. As the temperature drops below the lower critical solution temperature (LCST) of the PIPAAm (~32° C.) the PIPAAm swelled and dissolved, resulting in the non-destructive release of the square ECM nano-scaffolds.

Different cells types can be used for the encapsulation process. For example, the murine skeletal myoblast C2C12 cell line (ATCC) was cultured in high glucose Dulbecco's modified Eagle Medium (DMEM) supplemented with 10% fetal bovine serum (FBS), 1% penicillin-streptomycin and 2 mM L-glutamine in an incubator at 37° C. and 10% CO2. Bovine corneal endothelial cells (CECs) were isolated from fresh whole bovine eyes (Pel-Freez Biologicals). In some implementations, the corneas were excised from whole globes and soaked for 20 minutes in PBS including 1% penicillin-streptomycin-amphotericin B and 0.5% gentamicin (Life Technologies). Corneas were incubated endothelial side up in a 12-well spot plate with approximately 300 µL of a recombinant enzyme at 37° C. for 20 min.

CECs were released into the recombinant enzyme by gently scraping with a rubber scalpel, combined and centrifuged for 5 min at 1500 rpm. The cells were designated as passage 0 (P0), re-suspended in low glucose DMEM with 10% FBS, 1% penicillin-streptomycin-amphotericin B and 0.5% gentamicin and cultured in flasks until passage 2. Embryonic chick cardiomyocytes were isolated from the ventricles of day 7 chicken embryos based on published methods. In some implementations, cardiomyocytes were diluted to a density of 250,000 cells/mL in M-199 media supplemented with 10% heat-inactivated FBS and 1% penicillin-streptomycin and 2 mL of cell suspension was seeded onto the samples for the encapsulation process. The seeding concentration of the cardiomyocytes was higher than for the other cell types to achieve adequate cell adhesion to the FN squares because of the lower adhesivity of cardiomyocytes as compared to other cell types such as fibroblasts.

To shrink wrap cells in the ECM nano-scaffolds, the coverslips patterned with the ECM protein squares were first placed in 35 mm diameter tissue culture Petri dishes and sterilized under UV light in the biosafety cabinet for 30 min. The Petri dishes were placed on a hot plate and the coverslips inside are warmed to 40° C. The cells were suspended in culture media at a concentration of 25,000 cells/mL for the C2C12 and CECs or a concentration of 250,000 cells/mL for the cardiomyocytes. In some implementations, cell solutions were placed in a 15 mL centrifuge tube and heated in a dry block to approximately 42° C.

Once the cell solution reaches 42° C. the cell was seeded onto the warm coverslips immediately in order to minimize the time cells are exposed to this elevated temperature. The seeded cells were transferred to the 37° C. cell culture incubator. C2C12 and CECs are incubated with the ECM protein squares for 2.5 hours to ensure cell attachment and provide time for initial spreading, such as in step 120 of FIG. 1. Cardiomyocytes were incubated for 4 hours to allow additional time for attachment because these cells take longer to establish focal adhesions after isolation from the heart. After incubation, the Petri dishes were removed from the incubator and the media is aspirated and samples were rinsed with 40° C. PBS to remove non-adherent cells.

Any cells adhered to the coverslip were attached and spread on the ECM protein squares, such as in step 130 in FIG. 1. To shrink wrap cells, 2 mL of 40° C. PBS was added to the Petri dish and allowed to cool to room temperature. As the PIPAAm passes through the LCST, the ECM protein squares were released and contracted around the adhered cells, partially encapsulating them in an ECM protein nano-scaffold, as seen in step 140 of FIG. 1. After release these shrink wrapped cells were handled in a manner equivalent to standard cells in suspension using serological and micropipettes.

The percent viability of the cells can be determined by fluorescent labeling, such as using a LIVE/DEAD Mammalian Cell Cytotoxicity Kit (Life Technologies). Briefly, 4 µL of ethidium homodimer was used to bind to the DNA of dead cells and label them fluorescent red and 1 µL of calcein AM was used to label live cells, which enzymatically converted the dye to fluorescent green. These dyes were incubated with the cells at 37° C. for 30 min following the shrink wrapping process. Control experiments were also performed to determine if the transient exposure to slightly elevated temperatures (40-42° C.) during encapsulation had impacted cell viability. In some implementations, as a first control, C2C12 cells were taken through the same heating and cooling stages they experienced during encapsulation; being heated to 42° C., seeded in a 35 mm tissue culture polystyrene Petri dish, cultured at 37° C. for 2.5 hours, and then cooled from 37 to 25° C. to simulate the release process. In some implementations, as a second control, C2C12 cells were seeded in a 35 mm tissue culture polystyrene Petri dish and cultured for 2.5 hours while maintained at 37° C. during the entire process, i.e., subjected neither to heating or cooling. For both control groups, after the prescribed process, LIVE/DEAD dye was incubated with the cells for 30 min at 37° C. prior to analysis. Cells in the experimental and control groups were then imaged using a fluorescent microscope and post-processed to quantify the number of live and dead cells per image. For experimental groups, five images were taken per sample and five samples were analyzed per cell type (n=5, endothelial, cardiomyocytes, and C2C12) and for control groups three samples are analyzed per temperature condition (n=3).

To better understand the encapsulation process, both the ECM proteins and the cells were fluorescently labeled. To visualize the ECM nano-scaffolds, FN was fluorescently labeled by conjugation to Alexa Fluor 546 Maleimide (Life Technologies) following the manufacturer's instructions in order to bind free cysteines. Fluorescent (FN) was combined in a ratio of 2:3 with unlabeled FN and used to pattern 75 lm squares on PIPAAm coated coverslips. These FN squares were imaged pre-release and post-release using a laser scanning confocal microscope (Zeiss LSM 700). To image cells adhered to the FN squares pre-release, C2C12s were re-suspended in Opti-MEM media (no Phenol red) supplemented with 2% FBS and 1% penicillin-streptomycin and seeded onto samples mounted in a custom stage-top incubation system maintained at 40° C. to prevent premature PIPAAm dissolution.

After two hours, the samples were rinsed with 40° C. PBS to remove non-adherent cells and then fixed and permeabilized in a 40° C. solution of 4% formaldehyde with 0.05% Triton-X for 10 min. The samples were then rinsed three times with 40° C. PBS and incubated with a 1:200 dilution of 4′,6-diamidino-2-phenylindole, dihydrochloride (DAPI, Life Technologies), a 1:100 dilution of rabbit anti-vinculin primary antibody (Sigma-Aldrich) and a 1:100 dilution of Alexa Fluor 633 Phalloidin (Life Technologies) at 37° C. for 2 hours. The samples were subsequently rinsed three times with 40° C. PBS followed by incubation with a 1:100 dilution of Alexa Fluor 488 goat anti-rabbit secondary antibody (Life Technologies) at 37° C. for 2 hours. As noted, samples and solutions were maintained at ~40° C. throughout this process to ensure the PIPAAm did not dissolve.

After incubation with the secondary antibody the samples were rinsed with 40° C. PBS and imaged using Epifluorescent or confocal microscopy, continually maintained at 40° C. Fluorescent staining and imaging of shrink wrapped cells was accomplished with a similar process, but performed at room temperature since the PIPAAm was already dissolved. After release, the shrink wrapped C2C12s were allowed to settle on to the glass coverslip for approximately 30 min in order to adhere.

ECMs adhere to cell culture surfaces at a rate similar to cells seeded from suspension. The samples are then rinsed in PBS and fixed and permeabilized in 4% formaldehyde and 0.05% Triton-X. 5 drops of NucBlue Fixed Cell Stain (Life Technologies) can be added to visualize the nuclei. The samples are then incubated with 1:100 dilutions of rabbit anti-vinculin primary antibody and Alexa Fluor 633 phalloidin for 2 h. The samples are again rinsed with PBS and then incubated with 1:100 dilution of Alexa Fluor 488 goat anti-rabbit secondary antibody for 2 h. Finally, samples are rinsed with PBS and the coverslips are mounted to glass slides with Pro-Long Antifade reagent (Life Technologies). Individual shrink wrapped cells are imaged in 3D using confocal microscopy.

For analysis in 2D, C2C12 myoblast cells were seeded onto fluorescently labeled FN squares (40% Alexa Fluor 546, 60% unlabeled) as described previously and incubated for 2.5 hours in a cell culture incubator to permit cell adhesion. Following incubation, the samples were rinsed with 40° C. C2C12 growth media to remove non-adhered cells and then cooled to room temperature to shrink wrap the cells. To remove the dissolved PIPAAm from solution, the shrink wrapped cells were pipetted into a 15 mL centrifuge tube and centrifuged at 1100 rpm for 5 min. Note that after centrifugation the ECMs formed a cell pellet that is readily broken up back into suspension using gentle agitation, comparable to that typically obtained with cells in suspension. The supernatant was aspirated and the cells are re-suspended in 3 mL of growth media and seeded onto PDMS coated 25 mm diameter glass coverslips.

Control samples included C2C12 cells (not shrink wrapped) seeded onto PDMS coated coverslips. Samples were fixed in a 4% formaldehyde solution at 30 min, 12, and 24 hours post-seeding (n=3 per time point). The samples were rinsed with PBS and five drops of NucBlue are added. The samples were then incubated for 2 hours with a 1:100 dilution of Alexa Fluor 633 Phalloidin. In some implementations, samples were imaged with confocal microscopy consisting of 10 fields of view per sample.

To study cell behavior in 3D, C2C12 myoblast cells were shrink wrapped as described for the 2D studies, except after centrifugation the cells were re-suspended in 1 mL of culture media. C2C12 cells were embedded in fibrin gels by mixing 600 µL of the cell suspension with 540 µL of fibrinogen dissolved in sterile, distilled water at a concentration of 40 mg/mL. To initiate the formation of a fibrin gel, 60 µL of thrombin at a concentration of 20 U/mL was added to the cell-fibrinogen solution. The solution was mixed and evenly pipetted onto three glass coverslips (400 µL per coverslip) and allowed to gel.

Once the fibrin gels are fully formed, they are placed in a 6-well plate with 2 mL of C2C12 growth media and cultured in the incubator. Samples were fixed in 4% formaldehyde after 30 min, 12 and 24 hours (n=3 per time point). Control samples included C2C12 cells (not shrink wrapped) embedded in fibrin gels using the same process. After fixation cells were stained with a 1:200 dilution of DAPI and a 1:100 dilution of Alexa Fluor 633 Phalloidin for 2 hours and then washed in PBS. Samples were mounted on glass slides and imaged using confocal microscopy.

Referring to FIG. 2, a comparison 205 of dissolution timelines is shown. A ECM nano-scaffold was able to release from the PIPAAm surface during the thermally-trigged dissolution process and wrap around the adhered cell(s), as seen in timeline 200 of FIG. 2. The ECM nano-scaffolds were able to release and fold over in 3D. An array of 75 µm FN squares is patterned on the PIPAAm and released using SIA folded over on itself, as seen in timeline 210 of FIG. 2. This was then repeated for 75 µm squares composed of FIB 240, LAM 260, and Col IV 270. For each ECM protein, the squares released from the PIPAAm and formed an ECM nano-scaffold that folds over along one of the diagonal axes and results in a rolled up, triangular shape. The ECM proteins followed different release kinetics, where FN 220, FIB 230, and COL IV 270 contract and fold quickly (10-15 s) upon thermal release while LAM 260 contracts and folded more slowly (~35 s).

The encapsulation technique can be used with any of the ECM test proteins. C2C12 myoblasts were cultured on the different ECM nano-scaffolds and allowed to release. For FN 220, FIB 240, LAM 260, and Col IV 280 that the shrinking wrapping process occurred in a similar manner, resulting in a partially encapsulated cell, with the ECM protein appearing to be on the bottom of the cell. In each of timelines 210, 220, 230, 240, 250, 260, 270, and 280, tracking the release from the time the PIPAAm first started to dissolve (time=0) to complete release is ~40 s regardless of the ECM protein type. The nature of the release and partial encapsulation process was similar, with the spread cell appearing to pull the releasing ECM square in towards itself from one or more sides, eventually forming a ball-like structure. While the cells ball-up to a degree, the cells did not adopt the highly spherical morphology observed for cells that have been trypsinized.

Figure 3:
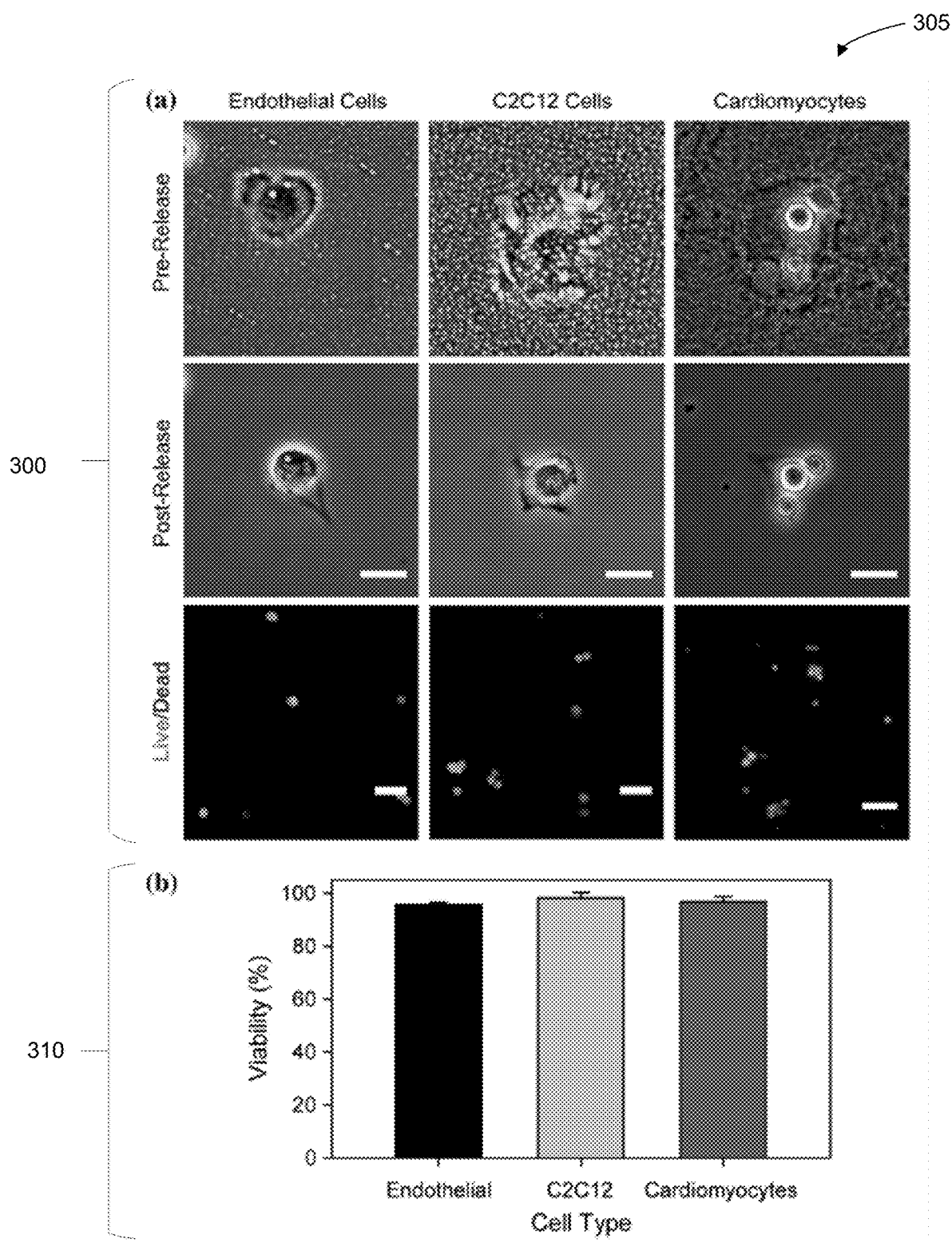

FIG. 3 shows a comparison 305 of encapsulation processes. The encapsulation process is rapid and induces changes in cell morphology. The C2C12s are the most robust because they are an established cell line, and as previously demonstrated in timeline 220 these cells can readily be shrink wrapped, as seen in 300 of FIG. 3. CECs can be used for the encapsulation process, which are a primary cell harvested directly from bovine corneas and cultured in vitro for <5 passages. Similar to the C2C12s, the CECs can be shrink wrapped in the FN nano-scaffold.

Since cardiomyocytes are known to adhere slowly compared to other cell types, the seeding density and the adhesion time is increased for cardiomyocytes. To adhere cardiomyocytes, a concentration of 250,000 cardiomyocytes/mL 4 hours for initial cell adhesion can be used. In contrast to the C2C12s and CECs, typically 3-4 cardiomyocytes adhere per FN square. However, despite the increase in cell number, the cardiomyocytes could be shrink wrapped in the FN in manner similar to the other cell types. A LIVE/DEAD cytotoxicity assay was used to determine the viability of each cell type after encapsulation as seen in graph 310 of FIG. 3. Each of the cell types exhibit high cell viability after the shrink wrapping process (endothelial cells=95.8±0.8%; C2C12=98.1±2.2%; cardiomyocytes=96.9±1.8%). In some implementations, the seeding density and adhesion time can be adjusted based on the size of the ECM. For example, as few as 10,000 cells can be seeded for single cell studies. For example, up to 300,000 cells can be seeded for monolayer samples. Attachment time can be approximately 30 minutes, but can be increased to a few hours for the single cells, or 24 hours for the full monolayers to ensure that tight junctions form.

The thermal treatment, including transient heating to 42° C. and cooling to room temperature, did not impact viability or bias the adhesion of cells to the ECM nano-scaffolds. For the thermal treatment control, cells experienced the same temperature changes as the shrink wrapped cells but were seeded into a TCPS Petri dish instead of undergoing the shrink wrapping process. In some implementations, a second constant temperature control was also performed where cells were simply maintained at 37° C., i.e., neither taken through the temperature changes nor shrink wrapped. Both the thermal treatment and constant temperature controls had high cell viabilities of 96.2±0.9 and 96.1±1.8%, respectively. Cell viabilities for experimental and control groups were analyzed by one-way ANOVA (a=0.05) and showed that there are no statistically significant differences between groups. The encapsulation technique was able to encapsulate multiple cell types in ECM nano-scaffolds with high viability. The thermal treatment, including transient heating to 42° C. and cooling to room temperature, did not affect cell viability.

As described above, FIG. 2 shows ECM nano-scaffolds patterned onto a surface and then shrink wrapped around the adhered cell(s). Timeline 200 shows the encapsulation process. Timeline 210 is an example of a 75 μm square FN nano-scaffold by itself during the thermal release process where the underlying PIPAAm dissolves into solution. The initial square shape resulted in spontaneous folding over along one of the diagonal axes into triangle-like form. Timelines 220 shows an example of a square FN ECM nano-scaffold with an adhered C2C12 myoblast. As the underlying PIPAAm dissolves the cell contracted and the FN ECM nano-scaffold partially folded around it. Timeline 230 shows an example of a square FIB nano-scaffold by itself during the release process. Timelines 240 shows an example of a square FIB nano-scaffold with an adhered C2C12 myoblast. Timeline 250 shows an example of a square LAM ECM nano-scaffold folding. Timeline 260 shows an example of a square LAM nano-scaffold with adhered C2C12 myoblast. Timeline 270 shows an example of a Col IV nano-scaffold folding. Timeline 280 shows an example of a COL4 nano-scaffold with adhered C2C12 myoblast. In FIG. 2, scale bars are 25 μm.

FIG. 3 shows that the ECM nano-scaffolds can be used to shrink wrap different cell types while maintaining cell viability. Images 300 show examples of a CEC, C2C12 myoblast and cardiomyocytes before and after shrink wrapping in FN nano-scaffolds. Representative images also show the live and dead cells present after encapsulation in the FN nano-scaffolds. Graph 310 shows the percent viability of each cell type after encapsulation in FN ECM nano-scaffolds. In FIG. 3, scale bars are 25 μm for the phase images and 50 μm for the fluorescent images and error bars indicate standard deviation.

Figure 4:
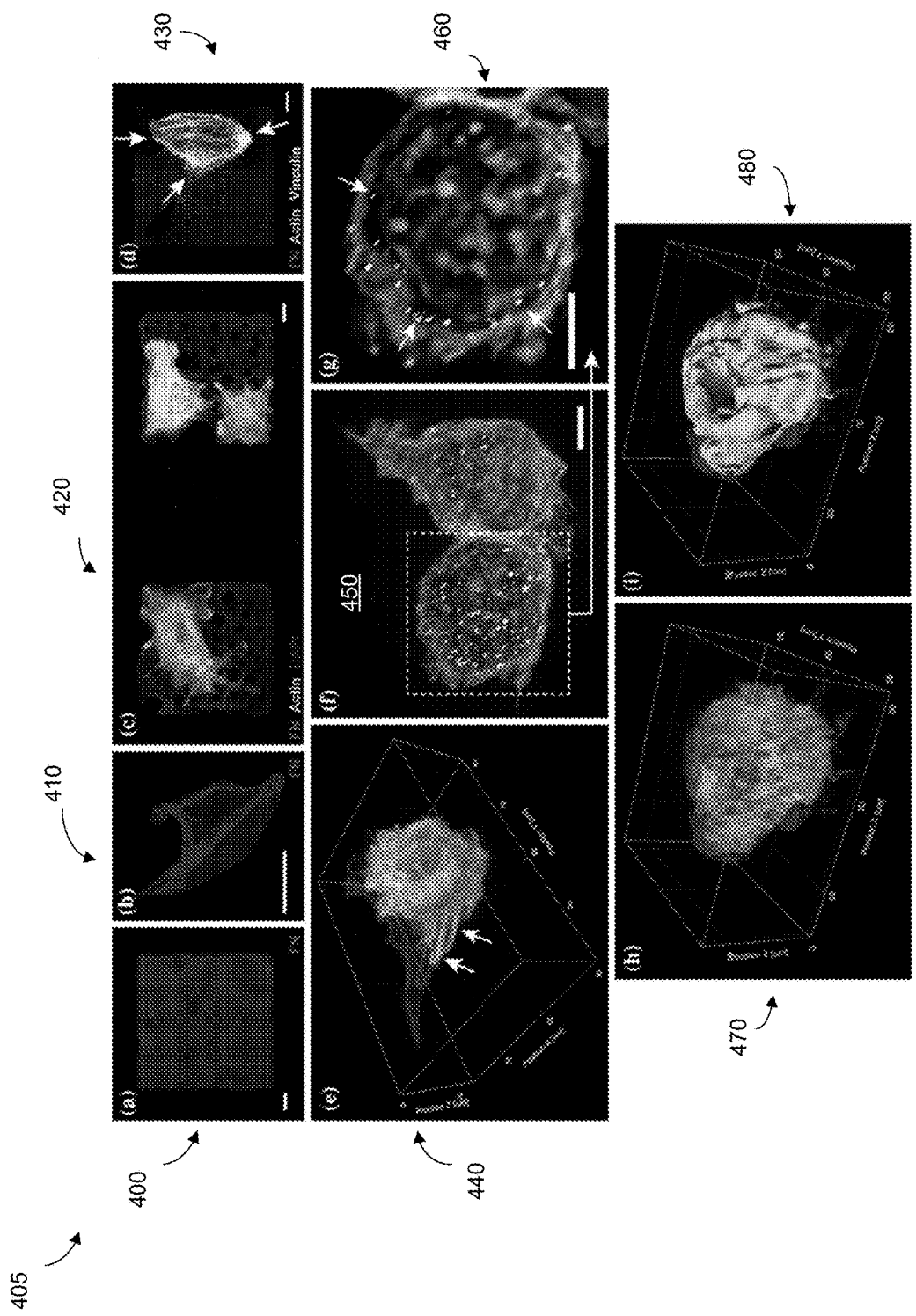

Referring to FIG. 4, a comparison 405 of encapsulation results is shown. To show the encapsulation process and how the ECM nano-scaffold interacted with the encapsulated cells, the ECM proteins and the cells are fluorescently labeled and imaged at high resolution. First, to show that the direct conjugation of fluorescent molecules to the free cysteine residues in FN does not disrupt the ability of FN to properly release and fold over itself, 75 μm FN squares were micropatterned with a 2:3 ratio of fluorescent to non-fluorescent FN, as seen in FIG. 4 in image 400. The FN nano-scaffold thermally released and was still able to properly fold over itself as shown in image 410. The C2C12 cells were seeded, allowing them to adhere for 2 hours. While maintaining 40° C. to prevent the dissolution of PIPAAm, the C2C12 cells were fixed, stained, and imaged in the pre-release state. The C2C12 cells adhered to the FN squares and spread to cover the surface, with clearly visible actin filaments demonstrating the formation of a typical actin cytoskeleton as shown in image 420. Staining for vinculin revealed focal adhesions at the end of actin filaments and deformation of the underlying FN square where the cell was clearly applying traction forces (white arrows, image 430). The elevated temperature fixing, staining and imaging process caused disruption of the underlying PIPAAm layer as visualized by holes forming in the FN square in images 420, 430. The holes did not appear to be present when performing the standard encapsulation technique.

The cells were fixed, stained and imaged after encapsulation to determine cell structure post-release. Unlike cells that have been trypsinized, after-encapsulated cells maintain some of their cytoskeletal structure including actin filaments still tethered to the FN nano-scaffold, as shown in image 440. Further, the C2C12 cells had a robust cortical actin cytoskeleton and retained cell-cell adhesions, based on the tight coupling of cells in the cases when two or more cells are shrink wrapped together, as shown in image 450. Focal adhesions also remained, as imaging vinculin reveals preservation of adhesions between the cell and the FN nano-scaffold below, as shown in image 450. A single slice of a confocal stack midway through the cell revealed that the adhesions continued as far up the side of the cell as the FN nano-scaffold, as shown in FIG. 460. The FN signal was segmented out, as shown in image 470, to show that the nano-scaffold only covers a portion of the cell surface. This becomes clearer when the cell nucleus and actin cytoskeleton are also rendered to show that the cell was effectively sitting on top of the FN, as shown in image 480. This demonstrated that the cells are only partially encapsulated in the FN nano-scaffold, and thus represents a difference between typical cell encapsulation approaches where the whole cell is usually surrounded by the scaffold material.

Figure 5:
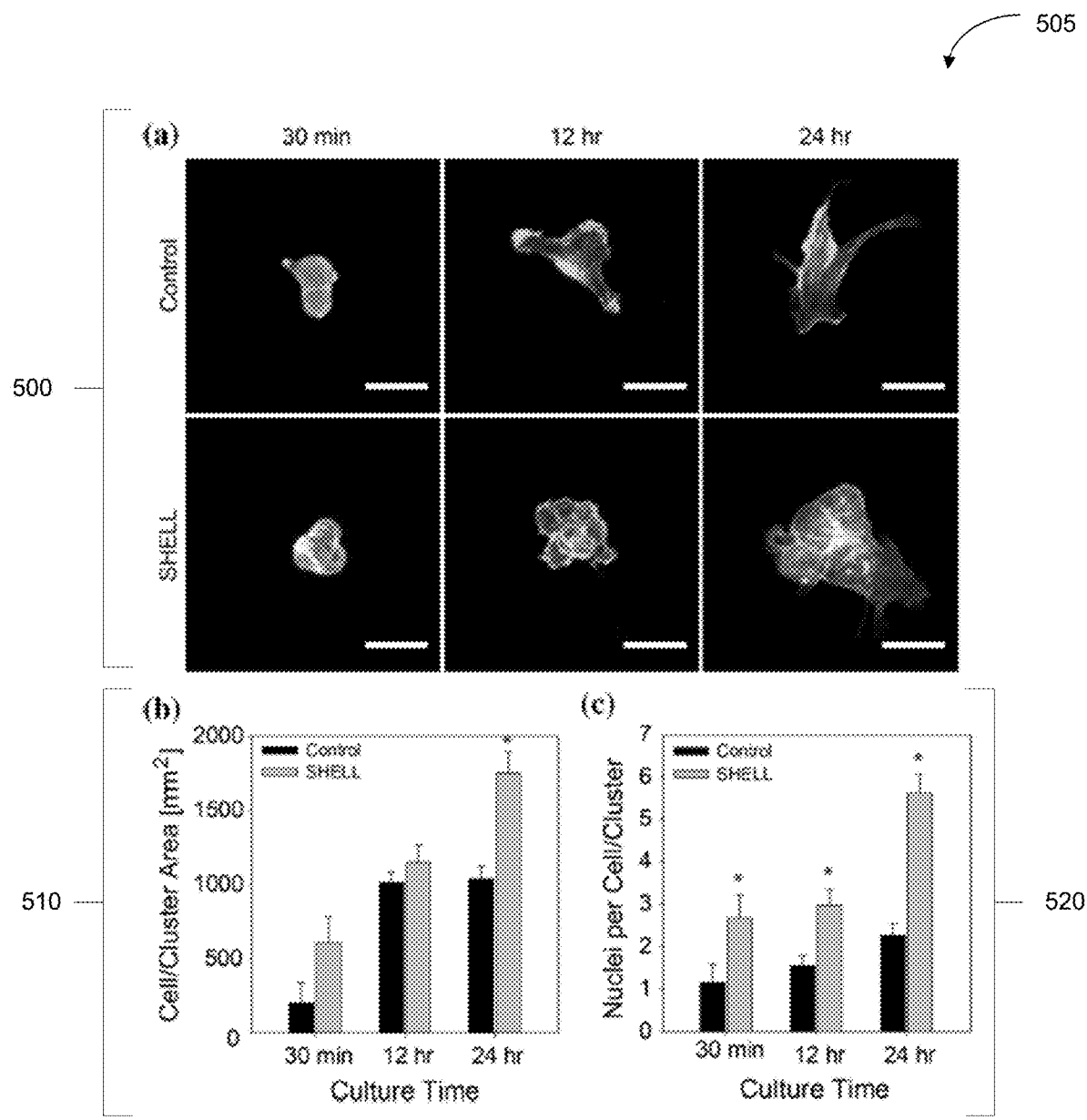
FIG. 5 shows images and graphs for extracellular matrix encapsulation.

FIG. 5 shows results 505 for encapsulated C2C12 cells seeded onto PDMS coated cover slips displayed significantly different behaviors compared to non-encapsulated controls. Images 500 show control cells (non-encapsulated) and encapsulated cells at 30 min, 12 and 24 hours after seeding onto PDMS coated coverslips. Shrink wrapped cells formed cell clusters with many nuclei centered around the FN nano-scaffold, whereas the control cells were more spread as mostly individual cells, with a F-actin cytoskeleton. Graph 510 shows an area of cells or cell clusters as a function of time was different, with the shrink wrapped cells continuing to spread throughout the experiment. Graph 520 shows the number of nuclei per cell/cluster as constant for the control cells, but increasing for the shrink wrapped cells indicating they are proliferating. For FIG. 5, scale bars are 25 μm and error bars are standard deviation.

For images 500, C2C12 cells were cultured as encapsulated or non-encapsulated controls on PDMS coated coverslips for 30 min, 12 and 24 hours to determine if there were any differences in cell spreading and growth. For this 2D growth assay the PDMS coated coverslip is not oxidized or pre-coated with any ECM proteins, thus it was a relatively hydrophobic surface to which cells typically exhibit poor adhesion and growth. Both the encapsulated and control cells adhered to the PDMS and begin to spread and proliferate, as shown in images 500. However, the morphology and growth rate of the cells differs greatly.

The control cells became flattened and spread out, mostly as single cells, and had at most one cell division during the 24-hour culture period. In contrast, the encapsulated samples had cells that spread out but remained coupled together in multicellular clusters, and individual cells are relatively rare compared to the control, even out to 24 hours of culture. Analysis of cell area reveals that the size of the control cells levels out after 12 hours because the cells are isolated or at most connected to one other cell, as shown in graph 510.

In contrast, cells in the encapsulation sample continued to grow and spread while remaining in clusters. The number of nuclei per cell or cell cluster increase similar to the cell area data, showing that the control cells have 1-2 nuclei per cell cluster while the encapsulated clusters have significantly more cells at each time point, as shown in graph 520.

Further, that the FN nano-scaffold remained relatively intact during the culture and is typically at the center of the encapsulated clusters. The encapsulation process altered the growth characteristics of cells in a 2D environment, causing a pronounced change from slow spreading single cells to relatively fast spreading and proliferating multicellular clusters.

Figure 6:
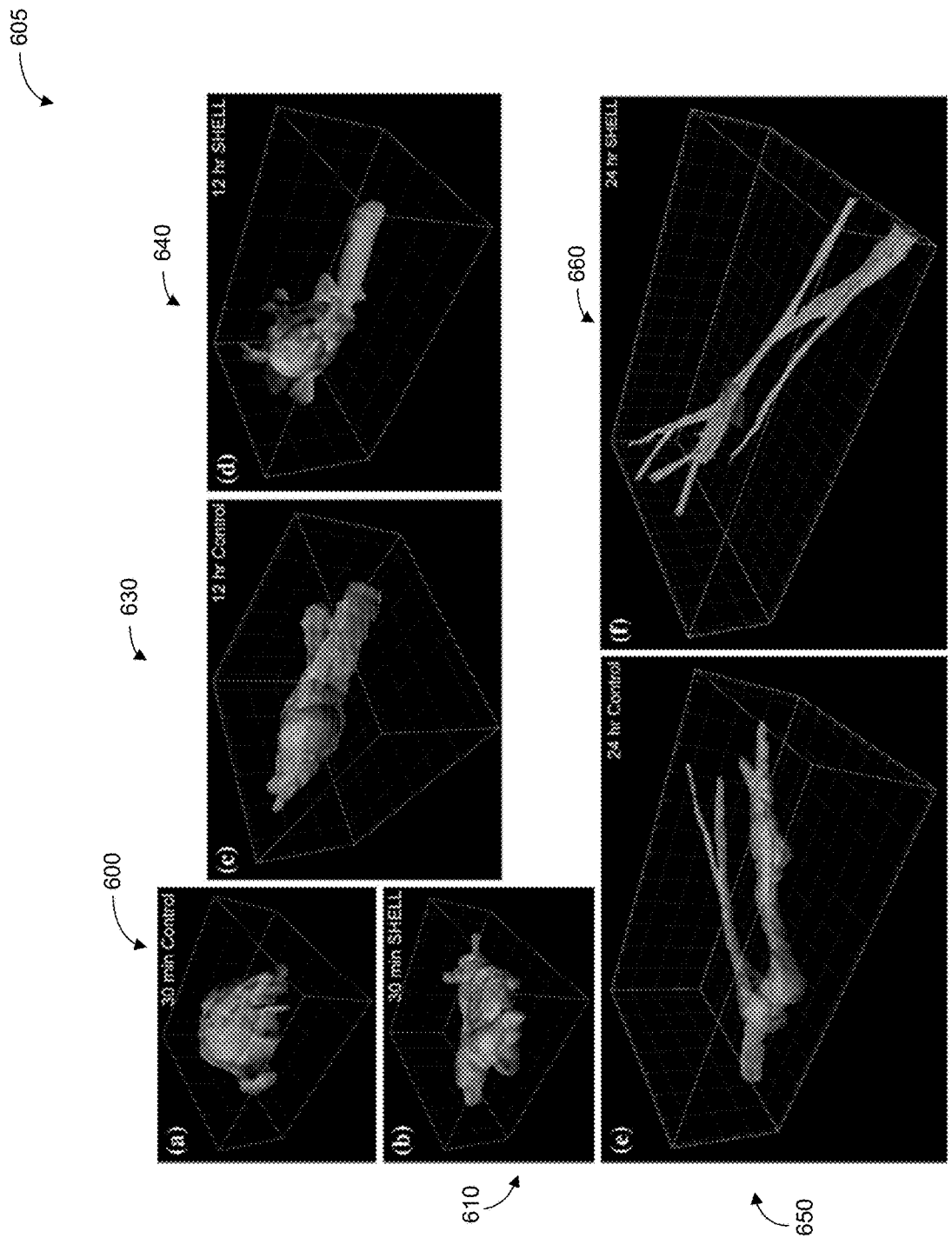
FIG. 6 shows images of extracellular matrix encapsulation.

FIG. 6 shows results 605 for encapsulated and control C2C12s seeded into 3D fibrin gels displayed similar growth and morphology over 24 hours in culture. At 30 min post-seeding, both control cells 600 and encapsulations 610 were still mostly rounded with a few cytoplasmic projections. By 12 hours post seeding, both control cells 620 and encapsulations 630 began to spread within the gels. By 24 hours post-seeding, control cells 640 and encapsulations 650 were highly elongated within the fibrin gel forming multicellular structures, possibly nascent myotubes. At each time point, the FN nano-scaffold were within the gels still associated with the encapsulations. Grid spacing in the 3D rendered images in 10 μm.

The encapsulated C2C12s and non-encapsulated controls were seeded inside fibrin gels. The overall growth and proliferation are similar for both conditions, such that, for a permissive 3D ECM hydrogel, the presence of the relatively small FN nano-scaffold has no measurable effect. For example, after 30 min both the encapsulated and control cells appear as relatively spherical with projections starting to be extended into the fibrin gel, as shown in images 600 and 610. The encapsulated C2C12s have longer protrusion and more of them.

After 12 hours both encapsulated and control cells had similar size and morphology, and in both cases had not yet appeared to begin to proliferate, as most cells were still isolated and mono-nucleated, shown in images 630, 640. After 24 hours there were still no apparent differences between the encapsulated and control cells, in 650 and 660, respectively. In both cases the cells had become highly elongated and form interconnected cell networks, perhaps even beginning to fuse into nascent myotubes. While the FN nano-scaffold did not appear to have any effect in the fibrin gel, it was present throughout the 24 hours culture period and was not completely degraded by the cells. Thus, in a highly permissive 3D ECM environment, within which cells already can easily adhere and move, the ECM nano-scaffold as currently engineered has no measureable effect on cell size and morphology as a function of time, compared to control cells.

The process for encapsulating cells in a defined ECM nano-scaffold, which partially encapsulates them in a sheet of dense matrix that preserves a degree of cytoskeletal structure, causes cell-matrix and cell-cell adhesions and can alter cell growth behavior in 2D. This encapsulation process has distinct differences from other cell encapsulation techniques as well as other cell-release approaches. For example, Okano and co-workers have pioneered the use of PIPAAm grafted to Petri dished for cell sheet engineering. While conceptually similar, cell sheet engineering relies on the cells to synthesize and assemble their own ECM over multiple days in culture. Further, cross-linked PIPAAm surfaces actually entrap nanometer thick layers of ECM protein after cell sheet release.

In contrast, for this encapsulation process, the PIPAAm is not grafted to the substrate, but rather it is physically entangled when in the hydrophobic states above the LCST and then hydrates and dissolves completely below the LCST. It is this complete dissolution that enables nanometer thick ECM protein nano-scaffolds to be non-destructively released during the SIA process. This encapsulation process is also different than other cell encapsulation techniques that use hydrogels composed of ECM proteins such as collagen, fibrin or matrigel or glycosaminoglycans such as hyaluronic acid and chitosan. With this encapsulation process the same proteins can be used as well as FN. The LAM and Col IV components of matri-gel can be used individually or in combination. This can provide improved control over the composition of the ECM being used to shrink wrap the cells.

Current cell encapsulation approaches are clearly effective in many applications, however the hydrogels used in many of these cases are by their nature mostly water. They do not match the protein dense ECM of the basement membrane. The engineered FN produced by SIA is 4-5 nm thick when patterned on the PIPAAm and as it contracts laterally during release increases to 50-100 nm thick. Using the pre-release thickness and 75 μm square dimensions, the volume of FN encapsulation around the cells is estimated as ~28 μm$^3$.

An upper limit from the amount of FN that absorbs to the PDMS stamp used for microcontact printing is estimated. For the 50 μg/mL concentration of FN used for microcontact printing, the maximum density of FN in the nano-scaffold is ~800 ng/cm. This means that FN is less than 100 nm thick and weighs less than ~0.22 pico-grams. This amount of FN material is sufficient to alter cytoskeletal structure, as shown in image 440 of FIG. 4, cell-cell and cell matrix adhesions 450 and 460 of FIG. 4, and growth behavior in 2D in FIG. 5. The 75 μm square used is created so that only few cells would be able to adhere, but the result is only partial encapsulation. Full-encapsulation is achieved with other geometries, such as any regular geometries. In some implementations, the ECM is more than 10 nm thick, so that at least 10 nm of ECM is available to transfer from the thermoresponsive substrate.

The tight conformal contact the ECM nano-scaffolds described herein is unique in terms of engineered structures that fold around cells, and this is due largely to the focal adhesions between the cell and the ECM protein. The strength of this cell-ECM adhesion is illustrated by the fact that the nano-scaffolds remain attached to single cells and small cells clusters despite being pipetted, centrifuged, and pipetted again, as done in the 2D and 3D cell growth studies (FIGS. 5-6). Additionally, once the cells have been re-seeded in a physiologic environment, the encapsulations remain intact, with the cells still attached to the nano-scaffolds after 24 hours.

An application for encapsulation is for therapeutic cell delivery, e.g. via injection. Two advantages for these cells are (i) having an assembled cytoskeleton that may help cells resist fluid shear forces during injection and (ii) having the cells delivered with a functional ECM to help modulate the local microenvironment, such as in the case of fibrotic or ischemic tissue. For example, cells injected through standard hypodermic needles are subjected to high shear forces that can significantly reduce cell viability.

The patches per injection depend on the injection site and the size of the needle and the desired cell number for injection, which will vary with target organ location and application. For example, in a CEC application, when injecting into mouse eyes, the cells are combined with a base medium of DMEM, with nothing else. In some implementations, 10,000 cells are administered using a 24, injection volume through a 32-gauge needle, which is around 200-250 patches. While this example is for mouse eyes, the number of cells and patches can be scaled up for human therapy.

Cells in suspension are normally released from a culture surface using trypsin and EDTA, which by design disrupts cell-matrix and cell-cell interactions, leading to cytoskeletal disassembly. Thus, the typical injected cell may be mechanically weak compared to the state it was in when adhered to the surface. It is possible that the retained cytoskeleton in the encapsulated samples (FIG. 4) will increase the stiffness of the cells and enable them to better resist the shear forces during syringe based delivery. However, the presence of F-actin does not always indicate the presence of cell contractility and increased cell stiffness.

As also mentioned, the encapsulated samples are at least partially encapsulated in a defined ECM, which helps modulate the local microenvironment at the site of cell delivery. FN, LAM, FIB and Col IV can each be used for encapsulation (FIG. 2), and it is straightforward to mix these ECM proteins in well-defined combinations. This can be done either by mixing the protein solutions together prior to microcontact printing or performing layered prints to create thicker, multicomponent ECM nano-scaffolds. This is important since the expression level of each protein and combinations of proteins thereof depend on tissue type and developmental stage. A major role of the ECM is to sequester growth factors and modulate their activity in conjunction with adhered cells.

Figure 7:
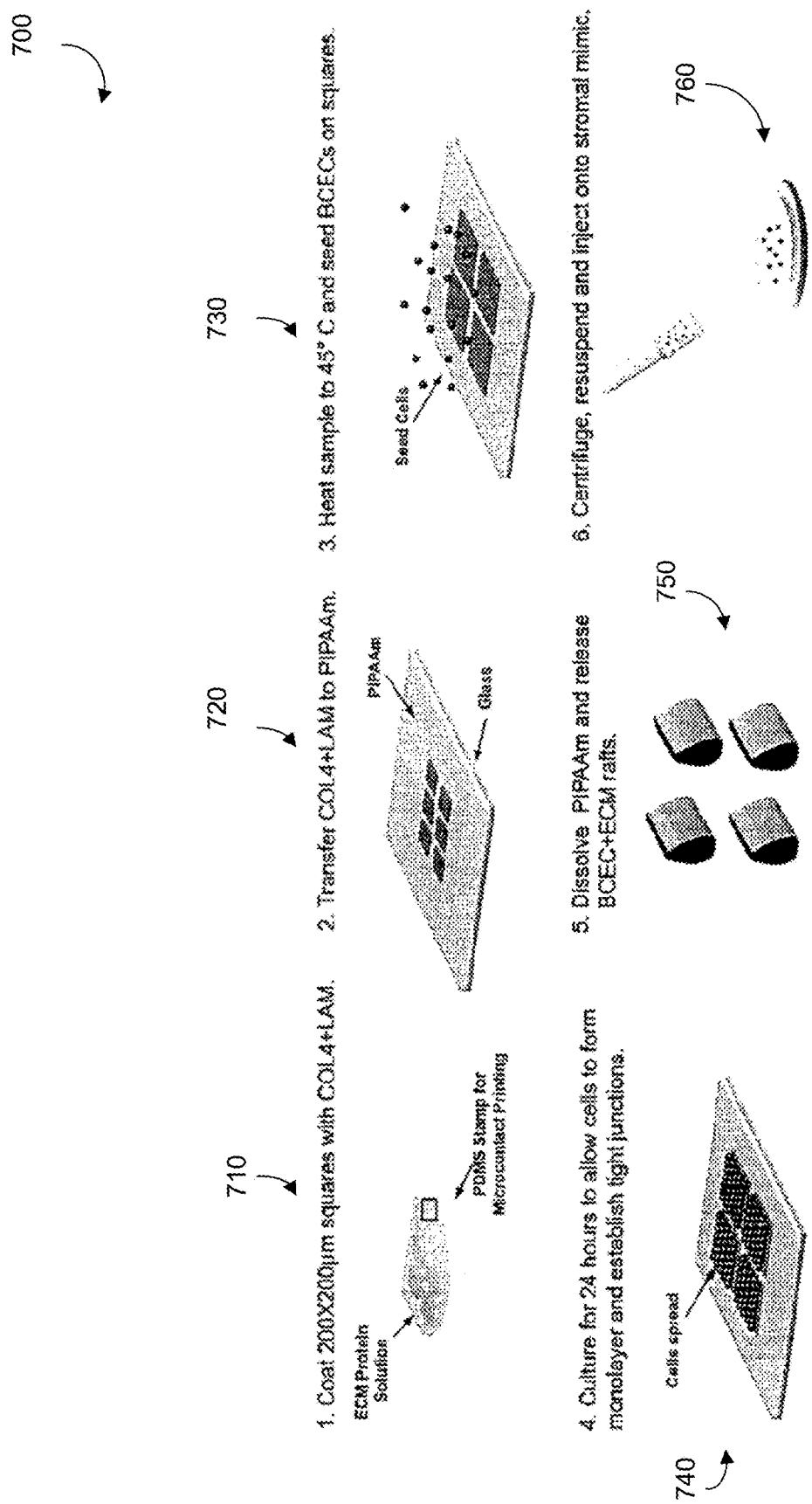
FIG. 7 shows a process for extracellular matrix encapsulation and administration.

Referring to FIG. 7, a process 700 shows how the encapsulated cells of the ECM were applied for therapeutic purposes. An example application, process 700 of FIG. 7, is described below that illustrates therapeutic use if the ECMs, but other applications are possible. ECM nano-scaffolds were fabricated utilizing surface initiated assembly techniques described above. PDMS stamps designed to have 200 µm square features were fabricated via soft lithography. The stamps were sonicated in 50% ethanol for 60 minutes, dried under a stream of nitrogen and incubated for 60 minutes with a 50:50 mixture of 50 µg/mL collagen IV (COL4) and 50 µg/mL laminin (LAM), as show at step 710. Following incubation, the stamps were rinsed in sterile water, dried under a stream of nitrogen and brought into conformal contact with poly(N-isopropylacrylamide) (PIPAAm) (2% high molecular weight, Scientific Polymers), and coated glass coverslips for 90 minutes to ensure transfer of the 200 µm square, as shown in step 720. Upon stamp removal, laser scanning confocal microscopy was used to determine the quality of the transferred ECM squares (Nikon Confocal).

For this example, Bovine corneal endothelial cells (BCECs) were isolated and cultured as previously described (ref EBM and expansion paper). In some implementations, corneas were excised from the whole globe, incubated endothelial side up in a ceramic 12 well spot plate with 400 µL of recombinant enzyme for 20 minutes. The cells were then gently scraped from the cornea using a rubber spatula, centrifuged at 1500 RPM for 5 minutes, re-suspended in 5 mL of media (low glucose DMEM with 10% PBS, 1% Pen/Strep/AmphB and 0.5% gentamicin, designated at P0, and cultured in a 50 kPa PDMS coated T-25 flask that is pre-coated with collagen IV. Cells were cultured until confluence and split 1:3 until they are used once confluent at P2. Patterned coverslips were placed in 35 mm petri dishes, placed on a hot plate and warmed until the coverslips inside were at 40° C. Cells were released from the culture flask, centrifuged and re-suspended at a density of 150,000 cells/mL in 15 mL centrifuge tubes. The tubes were placed in a dry block set at 45° C. for approximately 5 minutes, or until the cell solution just reached 40° C. and 2 mL of cell suspension was added to each 35 mm dish before it was immediately placed in an incubator (37° C., 5% $CO_2$). Cells were cultured on the squares for 24 hours to allow them to form small monolayers on the 200 µm squares.

For process 700, 200×200 µm squares of a 1:1 mixture of collagen IV and laminin were microcontact printed (720) onto the thermoresponsive polymer PIPAAm, that had been spincoated onto a glass coverslip. The coverslip was then heated (730) to 45° C. on a hot plate, and a BCEC suspension is heated to 40° C. in a dry bath, before seeding at a density of 250,000 cells per sample. The samples were kept in a 37° C. incubator for 24 hours to allow the cells to form (740) monolayers on the squares as well as tight junctions. After 24 hours, the samples were removed and cooled to room temperature to dissolve (750) the PIPAAm and release the BCEC monolayers supported by the ECM rafts. The rafts were then collected via centrifugation, re-suspended in media and injected (760) onto a compressed collagen I gel (stromal mimic) via a 28 G needle.

Figure 8:
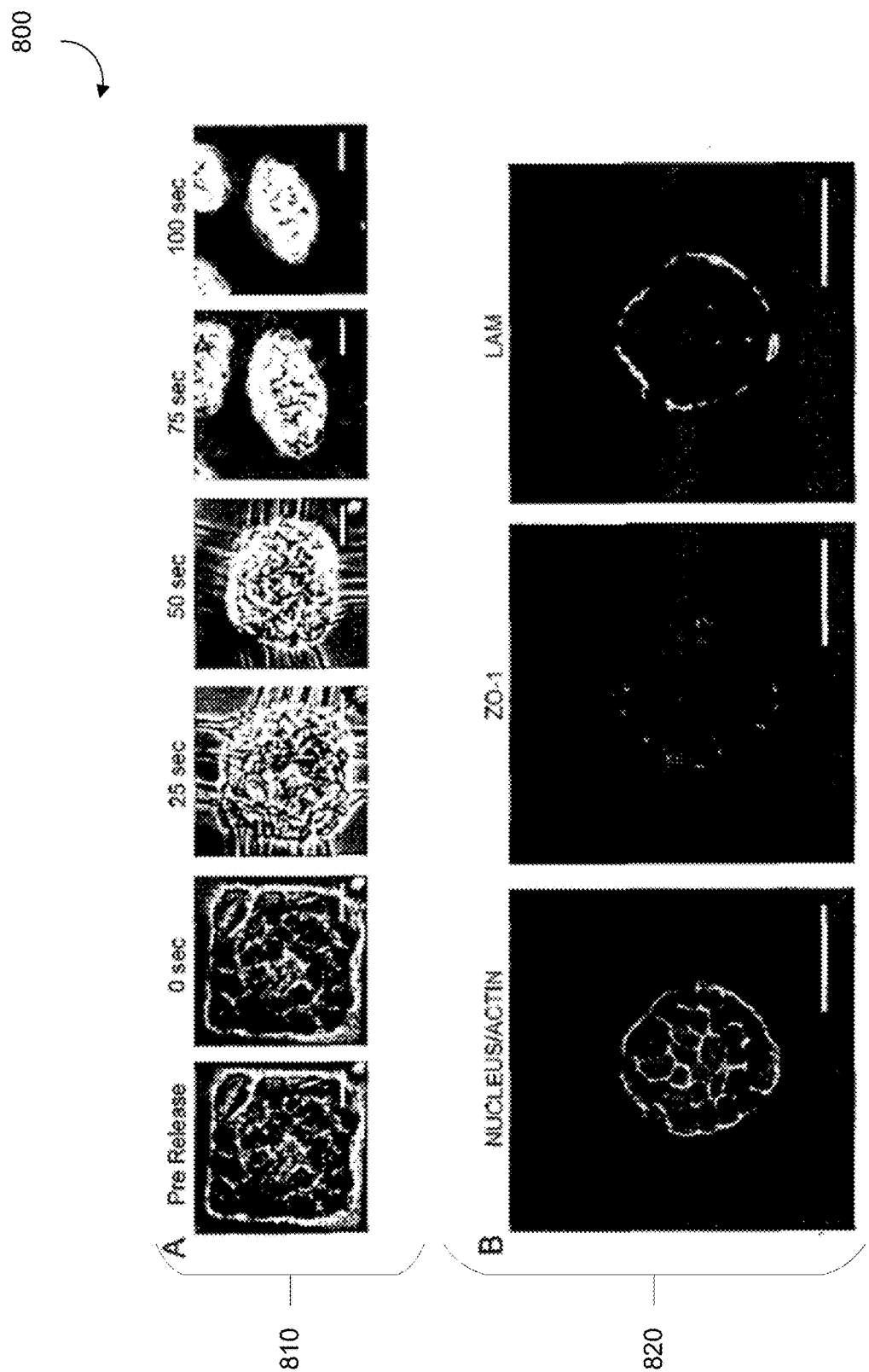
FIGS. 8-10 show images of extracellular matrix encapsulation.

FIG. 8 includes images 800 that show CECs were able to form monolayers on the micro-scaffolds that maintained their Z0-1 expression and F-actin cytoskeleton through the release process. Time lapse images 810 show the BCECs during the release process. The pre-release image shows that the cells have fanned a monolayer 24 hours after seeding. Time 0 sec is when the PIPAAm first starts to dissolve. The ECM rafts and CEC monolayers on the rafts contracted over 100 seconds before they settle into the compact structure seen in the last panel. For time line 801, the scale bar=50 µm. Time line 820 shows one slice of a z-stack of confocal images of the post release CEC rafts that were centrifuged and passed through a syringe/needle before staining. Time line 820 shows that the F-actin cytoskeleton and the expression of Z0-1 at the cell borders of the monolayer remained intact after release/injection as does the ECM raft. This was unique to the CEC rafts as it did not occur in enzymatically released single CECs. For time line 820, scale bars=50 µm.

Figure 9:
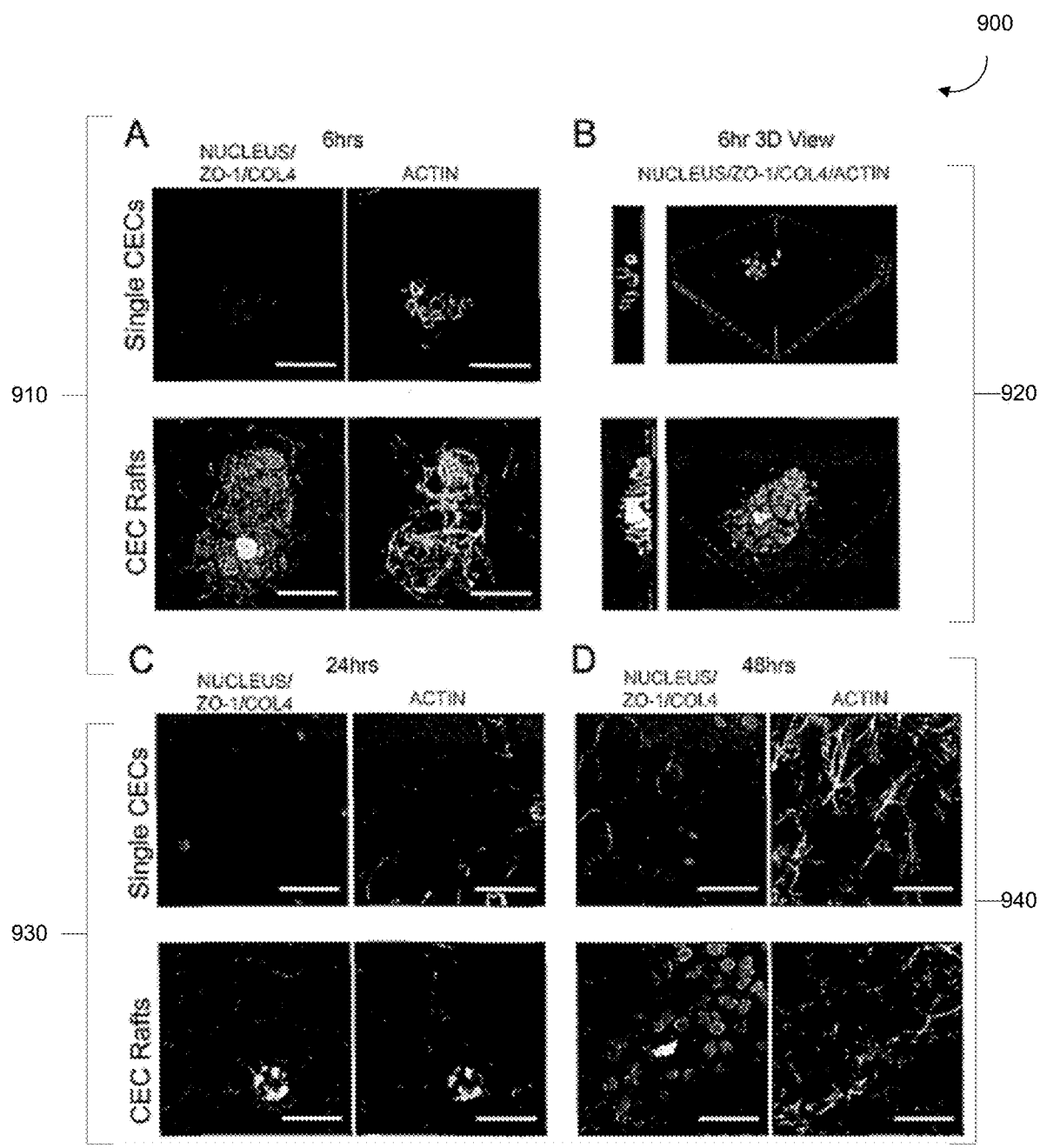

Referring to FIG. 9, images 900 show that CEC rafts maintained ZO-1 expression F-actin cytoskeleton as they grow out of the micro-scaffolds to form a monolayer on a collagen Igel/stromal mimic. Time line 910 shows that six hours after reseeding onto a collagen I-gel, CECs had maintained their Z0-1 expression and F-actin cytoskeleton, while growing out of the ECM rafts. The cells at the periphery of the CEC Raft clump were also expressing Z0-1. In contrast, the single CECs had no established F-actin cytoskeleton or Z0-1 expression. Time line 920 shows that the 3D views of the cells at 6 hours post seeding, and shows the differences between the single CECs and CEC rafts. The single CECs were still rounded and had no Z0-1 expression. The CECs in the rafts were growing out of the larger clump and cells both inside and outside of the rafts were expressing Z0-1 and have structured F-actin. Time line 930 shows that, at 24 hours, the CECs had already grown out of the rafts (but some of the protein is still intact) and formed an almost complete monolayer. The CECs from the rafts also expressed Z0-1 at one or more cell borders and had a cortical F-actin cytoskeleton, mimicking in vivo CECs. The single CECs have yet to form a monolayer, expressed no Z0-1 and have F-actin stress fibers located across the cell body. By 48 hours, in time line 940, the monolayer formed by the CEC rafts appeared denser than that formed by the single CECs. The single CECs were beginning to express Z0-1, though it is discontinuous, whereas the CEC rafts expressed Z0-1 at one or more cell borders. The F-actin cytoskeleton of the single CECs was still disorganized with stress fibers across the cell body, and the CEC rafts had maintained their cortical F-actin cytoskeleton. For FIG. 9, the scale bars=50 µm, except in the orthogonal views which are 20 µm.

Figure 10:
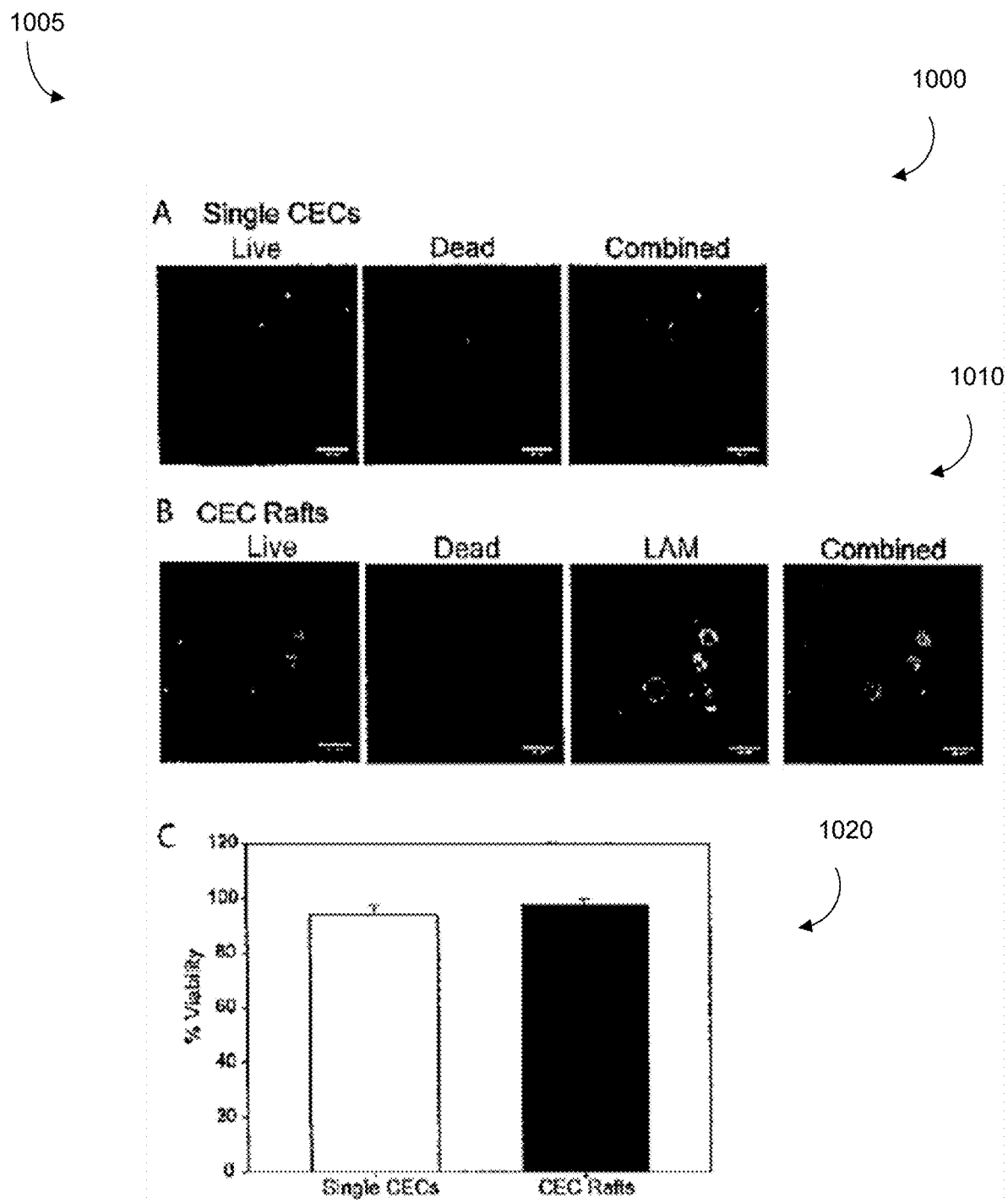

FIG. 10 shows results 1005 of the encapsulation process. CEC rafts maintain >97% viability after needle injection. Single ER-CECs 1000 were passed through a 28 G needle and maintained greater than 93% viability. CEC rafts 1010 were also injected through a 28 G needle and had greater than 97% viability. The only dead cells that were observed were single cells floating away from the actual MS-CECs. Graph 1020 shows a comparison between 1000 and 1010. For FIG. 10, scale bars=100 µm.

Figure 11:
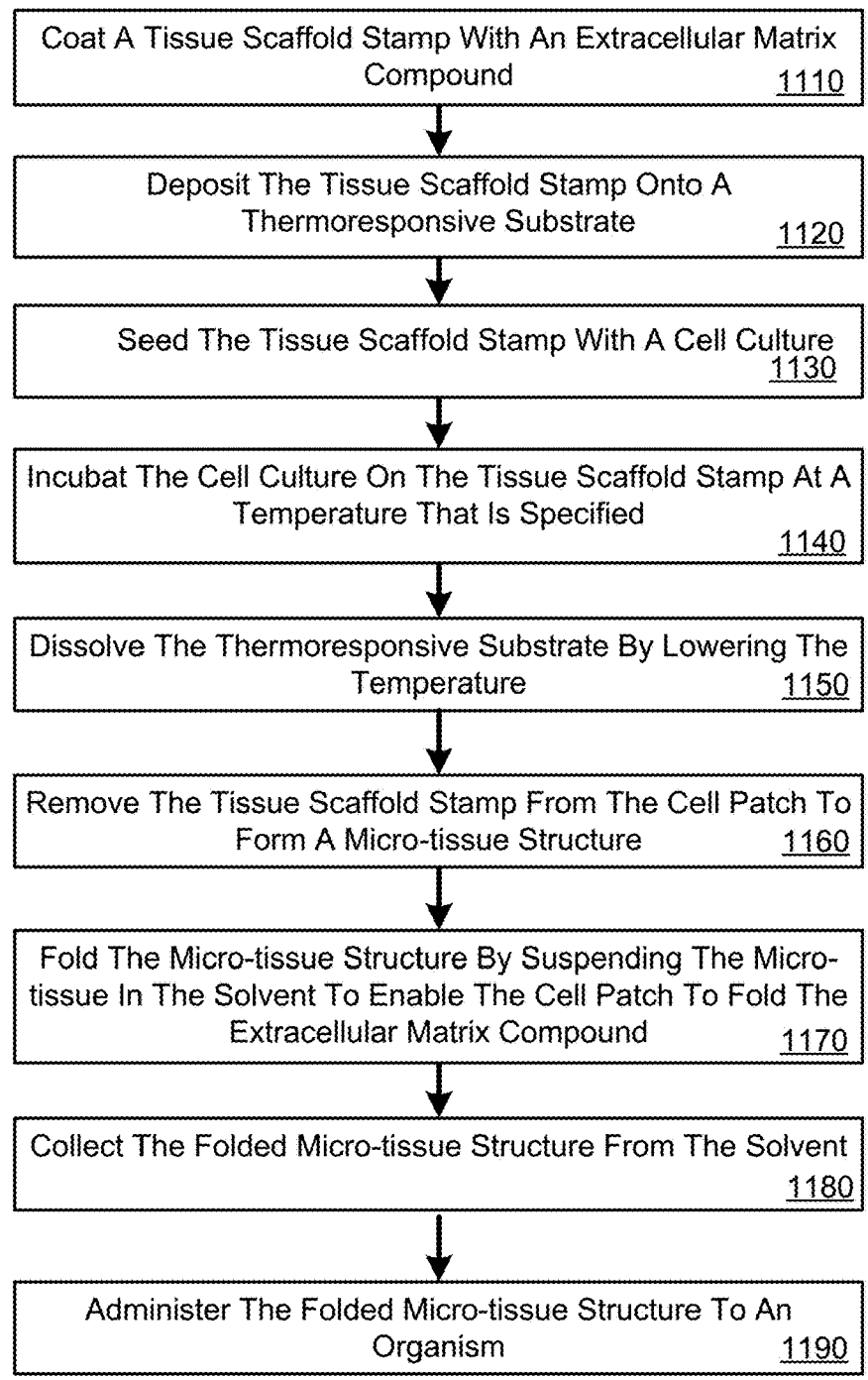
FIG. 11 shows a process for encapsulating cells.

Referring to FIG. 11, a process 1100 for encapsulating cells is shown. The tissue scaffold stamp is coated (1110) with an extracellular matrix compound. The tissue scaffold stamp was deposited (1120) onto a thermoresponsive substrate. The tissue scaffold stamp was seeded (1130) with a cell culture. The cell culture was incubated (1140) on the tissue scaffold stamp at a specified temperature, and the cell culture forms a cell patch that is attached to the extracellular matrix compound. The thermoresponsive substrate was dissolved (1150) by lowering the temperature. The tissue scaffold stamp was removed (1160) from the cell patch to form a micro-tissue structure by dissolving the tissue scaffold stamp in a solvent. The micro-tissue structure was folded (1170) suspending the micro-tissue in the solvent to enable the cell patch to fold the extracellular matrix compound, and the folding of the matrix compound also caused the micro-tissue structure to fold. The folded micro-tissue structure was collected (1180) from the solvent using a centrifuge. The folded micro-tissue structure was then administered (1190) to an organism.

A number of exemplary embodiments have been described. Nevertheless, it will be understood by one of ordinary skill in the art that various modifications may be made without departing from the spirit and scope of the techniques described herein.

What is claimed is:

1. A micro-tissue raft comprising:
   a cell patch comprising binders exposed on a first side of the cell patch, wherein cells of the cell patch comprise a Zonula Occludens-1 (ZO-1) protein expression that maintains tight cell-cell junctions; and
   an extracellular matrix compound comprising at least two cell types, the extracellular matrix being attached to a second side of the cell patch and that forms a base for the cell patch, wherein the extracellular matrix compound is configured to be responsive to one or more tension forces expressed by the cell patch, wherein the one or more tension forces cause the extracellular matrix compound to fold into a specified geometry around the cell patch, wherein the specified geometry substantially conceals the expressed binders of the cell patch, wherein the ZO-1 protein expression assists folding of the extracellular matrix around the cell patch.

2. The micro-tissue raft of claim 1, wherein the one or more tension forces are expressed by one or more junctions of one or more respective cells that form the cell patch.

3. The micro-tissue raft of claim 1, wherein the extracellular matrix compound is configured to fold into the specified geometry in response to removal of an organosilicon compound scaffold from the extracellular matrix compound.

4. The micro-tissue raft of claim 1, wherein the extracellular matrix compound is coupled to a scaffold, and wherein forms a planar geometry that exposes the expressed binders of the cell patch, and wherein the extracellular matrix compound alters a form when the scaffold is removed.

5. The micro-tissue raft of claim 1, wherein the cell patch is configured to protect the cell patch from forces during injecting.

6. The micro-tissue raft of claim 5, wherein a size of the cell patch is proportional to a size of a stamp of the extracellular matrix compound, and wherein the size of the micro-tissue raft is a fraction of a diameter of an injecting apparatus.

7. The micro-tissue raft of claim 6, wherein the stamp of the extracellular matrix compound comprises an organosilicon compound.

8. The micro-tissue raft of claim 7, wherein the organosilicon compound comprises Polydimethylsiloxane.

9. The micro-tissue raft of claim 1, wherein the extracellular matrix compound comprises a protein comprising one or more of collagen IV, laminin, a fibroblast growth factor protein, and a vascular endothelial growth factor protein.

10. The micro-tissue raft of claim 1, wherein the extracellular matrix is printed on a thermoresponsive substrate.

11. The micro-tissue raft of claim 10, wherein the thermoresponsive substrate comprises a PIPAAm polymer.

12. The micro-tissue raft of claim 1, wherein the extracellular matrix forms a tissue scaffold stamp comprising a surface dimension of less than or approximately equal to 250 µm$^2$.

13. The micro-tissue raft of claim 1, wherein the cell patch comprises one or more populations of corneal endothelial cells.

14. The micro-tissue raft of claim 1, wherein the cell patch comprises one or more populations of stem cells.

15. The micro-tissue raft of claim 1, wherein the cell patch forms a monolayer on a tissue scaffold stamp.

16. The micro-tissue raft of claim 1, wherein the extracellular matrix compound is approximately 200×200 micrometers in size, and wherein the cell patch folds the extracellular matrix compound when the extracellular matrix compound is released from a polydimethylsiloxane (PDMS) in a solution.

17. The micro-tissue raft of claim 1, wherein cells of the cell patch comprise a cortical F-actin cytoskeleton structure.

\* \* \* \* \*